(12) United States Patent
Decker (10) Patent No.: US 7,140,003 B2
(45) Date of Patent: Nov. 21, 2006

(54) METHOD AND SYSTEM FOR SPECIFYING SETS OF INSTRUCTIONS FOR SELECTION BY AN INSTRUCTION GENERATOR

(75) Inventor: Mark H. Decker, Rhinebeck, NY (US)

(73) Assignee: International Business Machines Corporation, Armonk, NY (US)

(*) Notice: Subject to any disclaimer, the term of this patent is extended or adjusted under 35 U.S.C. 154(b) by 737 days.

(21) Appl. No.: 10/367,332

(22) Filed: Feb. 14, 2003

(65) Prior Publication Data
US 2004/0163074 A1   Aug. 19, 2004

(51) Int. Cl.
G06F 94/04   (2006.01)
G06F 9/45   (2006.01)

(52) U.S. Cl. ........................ 717/106; 717/114; 717/143

(58) Field of Classification Search ................ 717/106, 717/114–117, 125–130, 140–143, 148
See application file for complete search history.

(56) References Cited

U.S. PATENT DOCUMENTS

| | | | |
|---|---|---|---|
| 3,930,236 A | 12/1975 | Ferguson et al | 340/172.5 |
| 4,155,120 A | 5/1979 | Keefer et al. | 364/200 |
| 4,179,737 A | 12/1979 | Kim | 364/200 |
| 4,393,469 A | 7/1983 | Boute | 364/900 |
| 4,875,160 A | 10/1989 | Brown, III | 364/200 |
| 4,907,192 A | 3/1990 | Kaneko | 364/900 |
| 5,274,775 A | 12/1993 | Croson | 395/375 |
| 5,371,862 A | 12/1994 | Suzuki et al. | 395/375 |
| 5,386,569 A * | 1/1995 | Harada et al. | 717/146 |
| 5,448,746 A | 9/1995 | Eickemeyer et al. | 395/800 |
| 5,485,411 A * | 1/1996 | Guttag et al. | 708/230 |
| 5,515,521 A | 5/1996 | Whitted, III et al. | 395/403 |
| 5,802,373 A * | 9/1998 | Yates et al. | 717/139 |
| 5,872,962 A | 2/1999 | Hisanaga et al. | 395/571 |
| 5,905,891 A * | 5/1999 | Harada et al. | 717/146 |
| 5,951,678 A | 9/1999 | Moyer | 712/237 |
| 5,996,070 A | 11/1999 | Yamada et al. | 712/236 |
| 6,091,897 A * | 7/2000 | Yates et al. | 717/138 |
| 6,108,776 A | 8/2000 | Check et al. | 712/240 |
| 6,125,444 A | 9/2000 | Check et al. | 712/245 |
| 6,226,789 B1 * | 5/2001 | Tye et al. | 717/138 |
| 6,367,076 B1 * | 4/2002 | Imai et al. | 717/152 |
| 6,502,237 B1 * | 12/2002 | Yates et al. | 717/136 |
| 6,658,560 B1 * | 12/2003 | Kawaguchi | 712/245 |
| 6,782,518 B1 * | 8/2004 | Decker | 716/5 |
| 6,799,315 B1 * | 9/2004 | Waki et al. | 717/148 |
| 6,973,640 B1 * | 12/2005 | Little et al. | 717/106 |
| 6,996,803 B1 * | 2/2006 | Sakamoto et al. | 717/109 |

OTHER PUBLICATIONS

Iwashita et al, "Automatic program generator for simulation based processor verification", IEEE, pp. 298-303, 1994.*
Bose et al, "Automatic bias generation using pipeline instruction state coverage for biased random instruction generation", IEEE, pp. 65-71, 2001.*

(Continued)

Primary Examiner—Anil Khatri
(74) Attorney, Agent, or Firm—Cantor Colburn LLP (57) ABSTRACT

A method for specifying a set of instructions selectable for generation by an instruction generator is disclosed. A class name representative of a class of instructions is identified and concatenated with a unique identifier label, thereby defining a unique singleton meta-mnemonic representative of a set of instructions. The class of instructions and the set of instructions are subsets of the instruction set of the processor. The resulting singleton meta-mnemonic specifies the set of instructions available for selection and generation by the instruction generator.

15 Claims, 4 Drawing Sheets

OTHER PUBLICATIONS

Abbaspour et al, "Retargetable binary utilities", ACM DAC, pp. 331-336, 2002.*

Farfeleder et al, "effective compiler generation by architecture description", ACM LCTES, pp. 145152, 2006.*

Abdelguerfi, M. and D. Hitesh, "Design of an Advanced Binary Decision Machine for On/Off Industrial Control", IASAM, 1992, IEEE conf record, pp. 1687-1694.

IBM Technical Disclosure Bulletin, V31, No. 4, Sep. 1988, pp. 44-47.

* cited by examiner

METHOD AND SYSTEM FOR SPECIFYING SETS OF INSTRUCTIONS FOR SELECTION BY AN INSTRUCTION GENERATOR

BACKGROUND OF THE INVENTION

The present disclosure relates generally to a method and apparatus for specifying a set of instructions for selection by an instruction generator, and particularly to a method and apparatus for dynamically and conditionally specifying a set of instructions that are available for selection by an instruction stream testcase generator when choosing the next instruction to generate.

Testing of a superscalar microprocessor architecture requires the generation of a large number of instruction sequences to assure that the microprocessor behaves properly under a wide variety of circumstances. Verification techniques generally require automated testing systems that can turn out high volume testcases in an effort to sufficiently cover the realm of possible behaviors of the integrated circuit being tested. Testcases may be generated by a testcase generator in accordance with parameters specified in a file that are provided by a software design specialist or engineer, otherwise the generator generates random testcases.

Generation of instruction sequences can be pseudo-randomly selected or guided based on templates in input files that are specified by the engineer that detail the instructions to generate. Each instruction selection within a template can be an explicit instruction mnemonic, such as, n1: LR, where the instruction LR is explicitly defined;
a control statement that guides the selection of a given list of instruction mnemonics and/or macros, such as,
Oneof(AR;AEBR;), where the control statement "Oneof" selects one explicit mnemonic from a list, such as a list of two as shown; or
a group identifier/macro that gets replaced with a control statement and/or list of mnemonics, such as,
AnyHalfOp( ) is defined as One of(LH;STH;)
Sequence(1.5 AnyHalfOp( )), where the control statement Sequence selects a random range of 1 to 5 instances of the macro.

Control statements and macros are used to generalize the template so that various instruction combinations can be tested with only one template. Macros may be declared external to the template and imported into more than one template.

New instructions that are added to the architecture of a processor require testing, which typically involves updating macros or instruction templates previously defined, thereby enabling them to be included in the new instruction set. New macros also need to be manually created to handle new groupings of instructions, whether based on architecture attributes or user selected groupings, which typically involves listing each instruction that is a part of the newly created grouping. Occasionally, instructions need to be avoided in the testcase generation, whether due to a segmented design or an instruction that is not yet fully implemented. Additionally, each explicit mnemonic reference, control statement, or macro that uses the new instruction typically needs to be temporarily updated to remove the new instruction and then updated again when the instruction is available for testing.

Macros with large lists of instructions are storage and computationally intensive as they are expanded to create structures for each control statement and each mnemonic listed. Typically these macros are reused multiple times in an instruction stream template. When selecting instructions based on a specific state of the machine, a macro needs to be created for each instruction in this grouping and must be utilized with the corresponding initialization file to insure the existence of the specific state.

Instruction sequence generators typically have attributes associated with each instruction in the architecture. Operand characteristics can also be specified for each operand of the instruction. These are usually kept with the instruction in some table format, such as:

OP(2A) MNEM(ADR) FMT(RR) CLASS(HFP, CC_Set) . . .

OP(50) MNEM(ST) FMT(RX) CLASS(General, Store) . . .

OP(E378) MNEM(LHY) FMT(RXY) CLASS(zArch, General, Fetch, LongDisp) . . .

OP(B31A) MNEM(ADBR) FMT(RRE) CLASS(BFP, CC_Set).

The architecture table is parsed and kept as an internal table to the generator. Use of the table facilitates testcase generation by having these instruction attributes and instruction operand characteristics readily available in a table lookup. Some of these instruction features include classifications of the instruction, that is, which class the instruction belongs to. The class identifier is a generic description for the type of instruction (such as Binary floating point), or what architecture facility it is a part of (such as Long Displacement Facility), or what format the instruction is (such RR, RRF, for example), or which architecture the instruction is valid in (such as zArch). Other instruction attributes and instruction operand attributes can be contained in the architecture table and can include instruction action (such as CC_Setter), or operand type (such as Fetch or Store).

Mnemonic specification for template guided instruction stream generation typically includes the use of explicit assembler mnemonics, control statements with a list of mnemonics, and group identifiers/macro expansion of mnemonics. Control statements guide the generation and selection of a given list of mnemonics. These control statements typically include the following types:

Sequence(n..m <substream>), which psuedo-randomly selects a number (i), such that (n<=i<=m) and creates (i) instances of <substream>;

Oneof(<substreamlist>), which psuedo-randomly selects and creates one element of the <substreamlist>;

Anyorder(<substreamlist>), which psuedo-randomly creates any permutation of the order of the items in <substreamlist>;

where,

<substream> represents either an explicit mnemonic, macro, or control statement, and <substreamlist> represents a list of one or more <substream> elements.

As noted above, superscalar processors utilize large instruction sets that need to be tested by the production and execution of a large number of instruction sequences. To accomplish this, instruction stream testcase generators need to turn out high volume testcases in order to sufficiently cover the realm of possible behaviors of the integrated circuit being tested. Accordingly, it would be advantageous to have a testcase generator that could effectively and efficiently generate the necessary instruction stream testcases.

SUMMARY OF THE INVENTION

In one embodiment, a method for specifying a set of instructions selectable for generation by an instruction generator is disclosed. A class name representative of a class of instructions is identified and concatenated with a unique identifier label, thereby defining a unique singleton meta-mnemonic representative of a set of instructions. The class of instructions and the set of instructions are subsets of the instruction set of the processor. The resulting singleton meta-mnemonic specifies the set of instructions for execution by the processor.

In another embodiment, a processor programmed for specifying a set of instructions selectable for generation by an instruction generator is disclosed. The processor is programmed to identify a first class name representative of a first class of instructions and to concatenate the first class name with a unique identifier label, thereby defining a unique singleton meta-mnemonic representative of a set of instructions. The processor can also identify a second class name representative of a second class of instructions and concatenate the first class name with the second class name and a unique identifier label, thereby defining a unique compound meta-mnemonic representative of a second set of instructions, each instruction in the second set of instructions having membership in each of the classes. The processor can also concatenate a singleton meta-mnemonic or a compound meta-mnemonic with an exclusionary label, thereby defining an exclusionary meta-mnemonic representative of a third set of instructions, each instruction in the third set of instructions having membership outside of the set of instructions defined by the singleton meta-mnemonic and compound meta-mnemonic. The classes and sets of instructions are all subsets of the instruction set of the processor. The processor is programmed to use singleton, compound, and exclusionary meta-mnemonics for specifying an instruction set for selection by the instruction generator.

In a further embodiment, a method for specifying a set of instructions for selection by an instruction generator is disclosed. The existing state of a processor is referenced and the architecture mode of the processor is determined. The architecture table of the processor is referenced and it is determined whether the architecture mode is a valid architecture mode for an instruction, as determined by reference to the architecture mode in the architecture table for the instruction. A valid architecture class name is assigned to the instruction in response to the architecture mode of the processor being a valid architecture mode specified for the instruction in the architecture table. The resulting valid architecture class name specifies a valid set of instructions that are a subset of the processor instruction set and are available for selection and generation by the instruction generator.

BRIEF DESCRIPTION OF THE DRAWINGS

Referring to the exemplary drawings wherein like elements are numbered alike in the accompanying Figures.

DETAILED DESCRIPTION OF THE INVENTION

An embodiment of the invention provides a method of dynamically and conditionally specifying a set of instructions selectable for generation by an instruction stream testcase generator (ISTG). The ISTG consists of compiled code that runs on a processor, which generates an instruction for each instance of an instruction to be generated by selecting an instruction from the specified set. Sets of instructions are subsets of the processor's instruction set.

An instruction set differs from a set of instructions in that the instruction set is the set of instructions available to and particular to the processor, while the set of instructions is a subset of the instruction set available for selection by the testcase generator at a particular point in the generation of the test instruction stream. The instruction set of the processor is defined by the architecture table of the ISTG.

A class of instructions is a grouping of instructions that have similar attributes, such as: general; control; floating point; hex floating point; binary floating point (BFP); input/output (I/O); architecture (zArch for example); and, format (RR for example). Classes may also be instruction attributes, such as: "CC setting"; "PSW referencing"; "store type"; and "privileged type", for example. They may also be the name of the architecture facility the instruction belongs to, such as: "Long Displacement"; and "Unicode", for example.

The predefined instruction classes available that are typically utilized include:

Categories;
    General,
    Control,
    Hex Floating Point (HFP),
    Binary Floating Point (BFP), for example);
Features;
    the Architecture feature that the instructions belong to, such as Long Displacement Facility or Unicode, for example,
    which architecture the instruction is valid in, such as z/Arch or s/390, for example;
Instruction Characteristic(s)/Attribute(s)/Action(s);
    Format, such as RR, RRF, for example,
    PSW_Reference, CC_Setter, serializing, privileged, for example,
    Instruction Type (Store, Fetch, Branch, for example),
    Implementation Type (Millicoded, or Hardwired(default), for example),
    Misc (Immediate data in instruction, interruptible, stacks, unstacks, can cause a trace entry, for example).

The format of the instruction set is typically architecture dependent. For example, in the z-architecture (zArch), an instruction is either one, two, or three halfwords in length and is located in storage on a halfword boundary. Each instruction is in one of 17 basic formats: E, RR, RRE, RRF, R, RXE, RXF, RS, RSE, RSI, RI, RIE, RIL, SI, S, SSE, and SS, with three variations of RRF, two variations of RS and RSE, and four variations of SS.

For example, an RR (register-register) instruction format is:

```
| Op Code | R1 | R2 |
 0         8    12   15
```

An RRE instruction format is:

```
| Op Code |/////////| R1 | R2 |
 0         16        24   28   31
```

An RX instruction format is:

```
| Op Code | R1 | X2 | B2 | D2 |
 0         8    12   16   20   31
```

Figure 1:
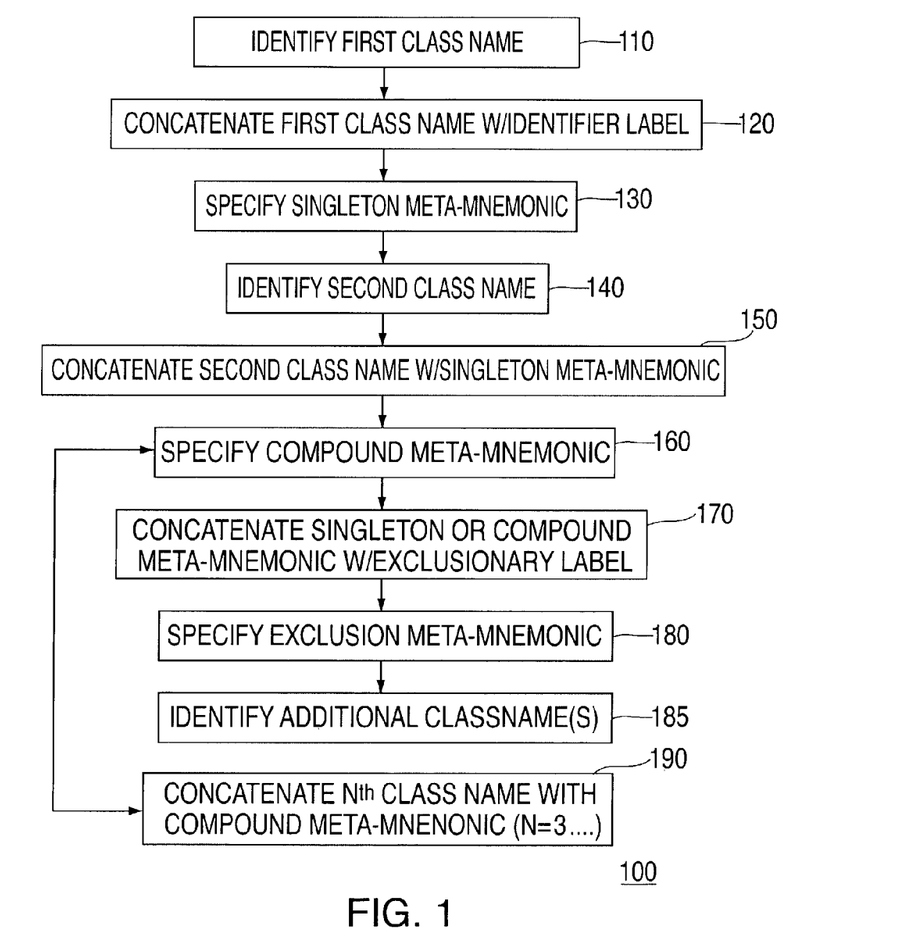
FIG. 1 is an exemplary method for selecting a set of instructions for execution by a processor in accordance with an embodiment of the invention.

FIG. 1 is an exemplary embodiment of a method 100 whereby an ISTG specifies a set of instructions for execution by a processor. The method takes into account that the processor running the ISTG has associated with it an instruction set that includes certain classes of instructions with associated class names. In method 100, the ISTG begins by identifying 110 a first class name representative of a first class of instructions. This first class name is then concatenated 120 with a unique identifier label (such as "_Op" for example) to provide a singleton meta-mnemonic of the form "<ClassName1>_Op", which may then be specified 130 as the set of instructions from which the ISTG selects an instruction for execution by the processor. As used herein, a meta-mnemonic is an alphanumeric that can take the place of an exact assembler mnemonic (also referred to as mnemonic), but represents a subset of instructions that is resolved to a single mnemonic at runtime. The singleton meta-mnemonic identifies that set of instructions where each instruction belongs to the designated class <ClassName1>. A singleton meta-mnemonic is also referred to as a primitive meta-mnemonic. At 140, the ISTG identifies a second class name representative of a second class of instructions, which is then concatenated 150 with the singleton meta-mnemonic to provide a compound meta-mnemonic of the form "<ClassName1>_<ClassName2>_Op", which may then be specified 160 as the set of instructions from which the ISTG selects an instruction. At 185, the ISTG identifies additional class names representative of additional classes of instructions, which can then be concatenated 190 with the compound meta-mnemonic. In this manner, further compound meta-mnemonics can be formed by concatenating a unique class name to a compound meta-mnemonic. The compound meta-mnemonic identifies that set of instructions where each instruction belongs to each of the designated classes <ClassName1> and <ClassName2>. At 170, the ISTG creates an exclusionary set of instructions by concatenating an exclusionary label (such as "Non_" for example) with either a singleton meta-mnemonic or a compound meta-mnemonic to create an exclusionary meta-mnemonic of the form "Non_<ClassName1>_Op" or "Non_<ClassName1>_<ClassName2>_Op", which may then be specified 180 as the set of instructions from which the ISTG selects an instruction. The exclusionary meta-mnemonic identifies that set of instructions where each instruction has membership outside of the set of instructions defined by the associated singleton mnemonic or compound mnemonic.

The following are examples of singleton meta-mnemonics, which are one class references: BFP_Op, which results in a set of instructions including binary floating point instructions; RR_Op, which results in a set of instructions including register-register formatted instructions; and, LWC_Op, which results in a set of instructions including membership in the LongWindedClass user defined class of instructions. The following are examples of compound meta-mnemonics, which are intersection or multi-class references: BFP_RR_Op and MyGroup_RRF_Op, which result in sets of instructions where each element is a member of each component class. The following are examples of exclusionary meta-mnemonics, which are prefixed singleton or compound meta-mnemonics that include all members not in the set described: Non_RR_Op, which results in a set of instructions that excludes those instructions having an RR format; Non_BFP_RR_Op, which results in a set of instructions that excludes those instructions that are binary floating point and RR format.

Thus, to specify a selection from the set of all instructions with an RR format, the meta-mnemonic RR_Op would be used. Similarly, to specify a selection from the set of all binary floating point instructions, the meta-mnemonic BFP_Op would be used. Contrasting the meta-mnemonics with a macro replacement scheme, to specify these sets of instructions with a macro replacement would entail defining the macro (e.g. Any_BFP_Op( )) and listing each instruction that is a member of that group. To create a group with only the binary floating point instructions that have RR formats, one would have to create a new macro (e.g. Any_BFP_R-R_Op( )) and list only those instructions that are members of each group. In accordance with an embodiment of the invention, as disclosed herein, a set of instructions having only binary floating point instructions and RR formats would be represented by the compound meta-mnemonic BFP_RR_Op.

Specifying the set of all instructions that are not in the group having binary floating point instructions and RR format is formed by adding the exclusion prefix (Non_) to the compound meta-mnemonic, for example, Non_BFP_R-R_Op. To use a macro or control statement with mnemonic lists to generate this grouping would entail listing the hundreds of instructions in this group.

Meta-mnemonics are very flexible and facilitate the writing of instruction templates. They also greatly reduce the amount of data and computations required when using the macro-replacement form. For example, without meta-mnemonics as herein disclosed, the creation of the group of instructions that are Hex Floating Point and RR Format would entail writing a macro that has 73 instructions, as represented by:

```
Macro AnyHexFloatRROp( ) {
   Oneof(ADR;AER;AUR;AWR;AXR; ....)
   Ocram.
```

Using the compound meta-mnemonic HFP_RR_Op, the same set of instructions would be selected with one command. When using the exemplary macro above with a "Sequence" control statement, such as:

Sequence(5...5 AnyHexFloatRROp( ));

each expansion of the macro would entail listing the control statement "Oneof", followed by a list of 73 instructions to select from. In this example there would be 5×(1(control statement)+73(instructions)) of information required. Using the meta-mnemonic with the same control statement would be:

Sequence(5..5 HFP_RR_Op);

which would result in only 5×1(instructions) of information required, and just one statement in a template.

An embodiment of the invention adds predefined dynamically-resolved classes and several predefined special case classes. These are not specified as part the architecture table associated with the processor. A dynamically-resolved class is based on the existing state of the processor, thus an instruction's membership to a dynamically-resolved class is conditional on the value of the mode or state in the processor. For example, in certain architectures some instructions are only valid in a specific architecture mode, such as z/Architecture or s/390. Some instructions are valid in both architectures. The architecture table for the processor specifies which instructions are valid for which architecture (the default is typically both if none is specified). In accordance with an embodiment of the invention, a predefined dynamically-resolved class of "ValidArch" is provided, which applies to an instruction only when the architecture mode of the processor is one of the valid architecture modes specified for the instruction in the architecture table for the processor. Also provided in an embodiment of the invention is a predefined special case class "Any", which every instruction is a member of. Other predefined special case classes provided in accordance with an embodiment of the invention are "Abort" and "Disable", which can only be used in the user-defined classes and are described in more detail below.

In an embodiment of the invention, users can define arbitrary classifications (user-defined classes) for instructions. These classes are similar to groupings in the macro-replacement scheme, discussed above, or where control statements are used with lists of mnemonics, but the meta-mnemonic method, as herein disclosed, has several advantages. A meta-mnemonic can be used to augment the membership of classes that an instruction belongs to, as defined by the ISTG's architecture table, by placing the user-defined classes in a user input file. A class name is first defined, and optionally abbreviated, then associated with one or more instructions. Alternatively, multiple classes may be associated with a single instruction. For example:

to define a new user class with abbreviation, the format is,
DEFINECLASS(LongWindedClass) ABBREV(LWC);
to assign a new user class to an instruction, the format is,
OP(57) MNEM(X) CLASS(LongWindedClass);
to assign a new user class to instructions using a class abbreviation, the format is,
MNEM(L,C) CLASS(LWC); and
to temporarily disable the selection of instruction ST, the format is,
MNEM(ST) CLASS(Disable).

An embodiment of the invention creates a predefined class name called "Disable", which is only available in the user-defined class input file, and when associated with an instruction, removes this instruction from every class (see CLASS(Disable) discussed above). The use of "Disable" provides a quick and easy method of temporarily removing an instruction from a class, thereby preventing the instruction from being selected. In contrast, the macro-replacement or control statement methods require that all files with this instruction be updated. Another predefined class available with an embodiment of the invention is "Abort", which when associated with an instruction, aborts the testcase generated when the associated instruction is encountered. The difference between "Disable" and "Abort" is that "Disable" prevents generation of an associated instruction, while "Abort" prevents the creation of a testcase with the associated instruction. The "Abort" sequence may occur due to self-modifying code not related to an instruction template, or due to a testcase generation guided by an instruction template.

An embodiment of the invention enables a user-defined class definition to have a conditional expression, based on the state, or mode, of the processor, to determine when the class is valid. A conditional expression permits the definition of user-defined dynamically-resolved classes to be based on the current state (or existing state) of the processor. The user-defined classes can reference register bits/values and modes of the processor. For example:

to define a dynamically-resolved class to only be valid when in zArchitecture and mode trace are active, the format is,
DEFINECLASS(MillicodedTrace) WHEN(zArch && CR9.ModeTrace); and
to assign a new user class to an instruction, the format is,
MNEM(BASSM) CLASS(MillicodedTrace).

The syntax for the user input file describing user-defined and user-defined dynamically resolved classes is:

```
<CondDefinition> ::= DEFINECOND ( <NewCondName> ) EXPR({<Expression>});
<NewClassDefinition> ::= DEFINECLASS (<NewClassName> ) [<NewClassAbbrev>]
  [<Condition>];
<Condition> ::= WHEN( <CondName> )
          ::= WHEN({<Expression>});
<NewCondName> ::= alphanumeric string, 32 max, unique;
<CondName> ::= any user-defined Condition name;
<Expression> ::= <Expression> <condOp> <Expression>
          ::={<Expression>}
          ::= <MachineStateSymbolic>
          ::= <value>;
<MachineStateSymbolic> ::= any symbol representing a bit or bits in a processor register
  or state/mode (e.g. zArch, PSW.ProblemState, CR9.ModeTrace, etc.);
<value> ::= hex or decimal number representable in 64 bits;
<NewClassName> ::= alphanumeric string, 32 max, unique;
<NewClassAbbrev> ::= ABBREV( <NewClassAbbrevName> );
<NewClassAbbrevName> ::= alphanumeric string, 8 max, unique;
<Class> ::= <class_list>;
```

-continued

```
<class_list> ::= <class>
            ::= <class>, <class_list>;
<class> ::= any predefined class or user-defined class.
```

The user input file for class definitions is parsed, and each new defined condition/class/abbreviation (element) is checked for uniqueness with other elements of the same type. In an embodiment, structures are created for holding the class name and optional abbreviation (default is null if not supplied) and optional associated expression (default is null if not specified). Each new class receives an assigned bit to represent it in the user class data area, with each bit being sequentially assigned from left to right. Other bit assignments may be possible without detracting from the teachings of the disclosed invention. To accommodate the new classes, the internal representation of the processor's architecture table is expanded to include a new field for each instruction's user-defined classes. The new field contains a bit map of user classes associated with the instruction, and is referenced when the ISTG evaluates the meta-mnemonics. During runtime, if there is an expression associated with the user-defined class, the expression is parsed and kept as a binary expression tree. The ISTG evaluates the expression when referencing membership in the subject class. The predefined classes can be represented by having bits of a structure represent each class, or by encoding several bits to represent a class (e.g. format). When the architecture table is parsed, it creates the structure for the classes that the instruction belongs to, and sets those bits to On. For example:

OP(2A) MNEM(ADR) FMT(RR) CLASS(HFP,CC_Set)

would indicate that the ADR instruction has classes HFP, CC_Set, and RR format enabled. The internal representation of the architecture table contains a field for the predefined static, dynamically-resolved, and special case classes.

When generating an instruction requiring determination of membership in a class, the user-defined class fields quickly and simultaneously determine membership in any class or multiple classes. Each class is represented by a unique bit value or by a unique encoding of bits. A compound meta-mnemonic would be represented by the logical OR-ing of the unique class bits of its component classes. To determine membership of an instruction in a class, one would logically AND the unique bits of the class wanted, represented by the meta-mnemonic, with the instruction's unique class information, and if it equaled the wanted class then the instruction would be a member of that class.

The predefined dynamically-resolved classes utilize the current state of the processor to determine if an instruction is a member. For the user-defined dynamically-resolved classes, the binary expression tree for the condition is evaluated to determine class inclusion. This evaluation consists of evaluating each part of the expression tree. Machine state variables (register, register components, modes, etc., including dynamic architecture values depending on mode (e.g. Length of page table entry)) and/or literals, get evaluated to values and then the conditions evaluated.

As discussed above, the created meta-mnemonic is formed by concatenating the class name with (_Op) for ease of identification and uniqueness of name with the current mnemonics. Meta-mnemonics are resolved at runtime and take up the same amount of instruction node space as one explicit mnemonic. While typical macros expand to have one structure for each instruction in the expansion, meta-mnemonics as herein disclosed would only take one structure, like an explicit instruction, which are then replaced with any instance of the specified set.

Utilizing the predefined dynamically-resolved class "ValidArch", discussed above, one can, in the current architecture mode irregardless of which mode it is, readily specify the group of instructions eligible for selection to be valid by using the meta-mnemonic ValidArch_Op, or to be invalid by using the meta-mnemonic Non_ValidArch_Op. Utilizing the user-defined dynamically-resolved class "MillicodedTrace", one can readily specify the avoidance of any instruction that is dynamically determined to currently be executed in millicode by using the meta-mnemonic Non_MillicodedTrace_Op. This flexibility removes the need to maintain separate macros or explicit mnemonic templates and their accompanying initialization files that insure those relationships. Utilizing the predefined special class "Any_Op", one can readily specify the selection of any instruction defined.

In an embodiment, there exists three control flow type instructions. The first is Sequential, where flow continues to the next adjacent instruction. The next two, Jump and Branch, are both non-sequential. In a Jump instruction, flow goes to the specified target instruction. In a Branch instruction, flow is based on a conditional check and either jumps to a target instruction or continues with the next sequential instruction. Jump and Branch type instructions must be specified with a target node, whereas sequential instructions must have no target node. An embodiment of the invention factors this template information, regarding target node and no target node, into the meta-mnemonic expression resolution. Accordingly, if the instruction location has no target node, thereby denoting a sequential instruction, then only sequential type instructions are permitted to be selected and any Jump/Branch types of instructions are skipped. Conversely, if the instruction location has a target node specified, thereby denoting a non-sequential instruction, then no sequential instructions are eligible for selection and they are skipped. This implicit handling of control flow and restricting the instructions selected facilitates selecting the correct kind of instruction for every instruction location, and assists the template writer by not requiring the explicit handling of control flow at every instruction.

Figure 2:
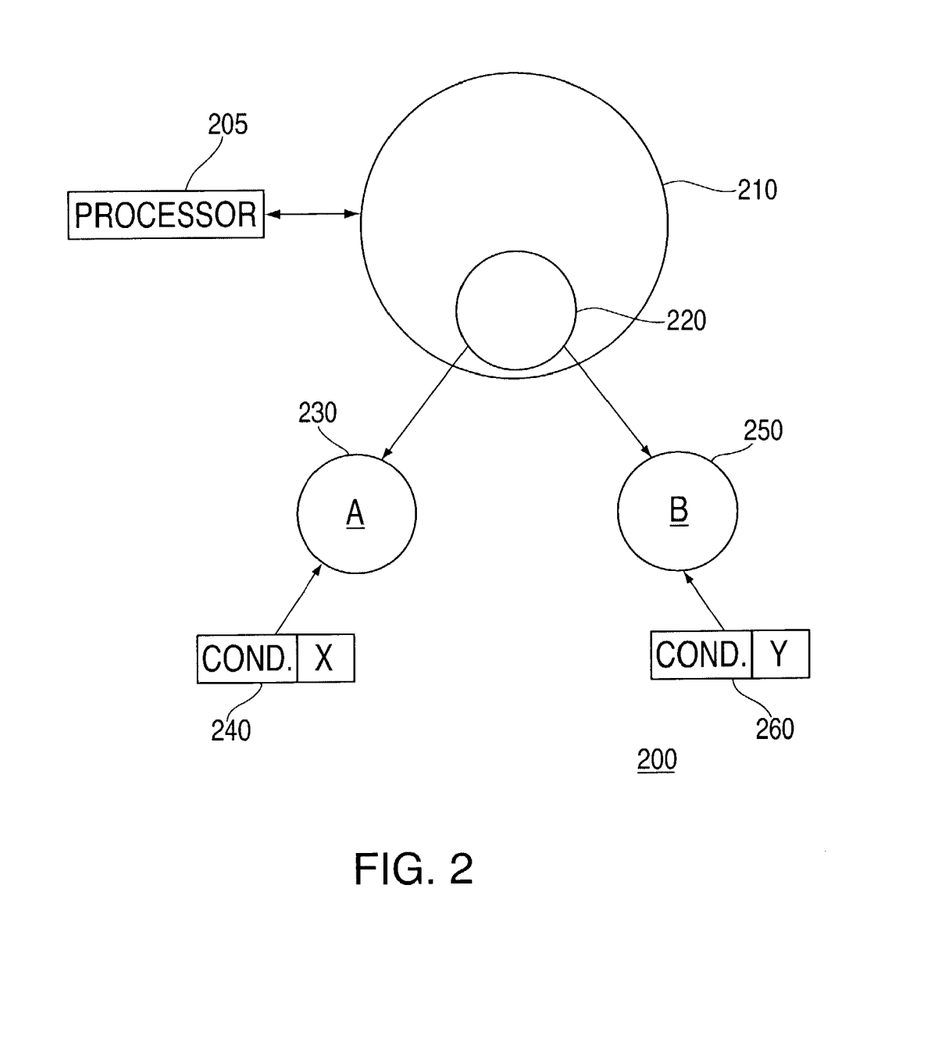
FIG. 2 is an exemplary process flow diagram for at least partially implementing the method of FIG. 1.

FIG. 2 depicts an illustrative representation of implicit control flow 200 controlled by a processor 205, where the processor instruction set 210 includes a set of instructions to be selected 220. The set of instructions to be selected is restricted to subset-A 230 that includes a first type of instruction (such as sequential type instructions (A)) if instruction-x 240 includes a first condition (such as no target node (x)). The set of instructions to be selected is restricted to subset-B 250 that includes a second type of instruction (such as non-sequential type instructions (B)) if instruction-y 260 includes a second condition (such as a target node (y)).

A further embodiment of the invention provides for utilization of complex set expressions with set operators.

These set expressions can reside in the same location a mnemonic or meta-mnemonic can reside. The set operators include the following:
- Union (|), which is a binary operator that includes all elements of both sets;
- Intersection(&), which is a binary operator that includes only those elements in both sets;
- Union less Intersection (^) (XOR), which includes elements in only one set but not both; and
- Exclusion(!), which is a unary operator that includes everything NOT in the specified set.

The syntax for the set expressions is:

```
<ClassExpr> ::= <ClassExpr> <BinaryOp> <ClassExpr>
                <CondExpr> ? <ClassExpr> : <ClassExpr>
                {<ClassExpr>}
                {<UnaryOp> <ClassExpr>}
                <MetaMnemonic>
                <Mnemonic>
<BinaryOp> ::= |, &, or ^
<UnaryOp> ::= !
<MetaMnemonic> ::= <Singleton>
                   <Compound>
                   <Negated>
<Singleton> ::= <ClassID>_Op
<ClassID> ::= Any embedded/predefined class or class abbreviation
(including format)
              Any user-defined class or class abbreviation
<Compound> ::= <ClassID>_<Singleton>
               <ClassID>_<Compound>
<Negated> ::= Non_<Singleton>
              Non_<Compound>
<CondExpr> ::= <expression> <condOp> <expression>
<Mnemonic> ::= any valid mnemonic
```

In the prior example, the compound meta-mnemonic BFP_RR_Op can also be equivalently achieved by using the set expression notation; {{BFP_Op} & {RR_Op}}.

In a further embodiment, one can conditionally select between two sets of descriptions of instructions based on the current state/mode of the processor. The syntax takes the form of the class syntax conditional expression using the ternary operator "?", noted above. In the expression <condexpr>?<setexpr1>:<setexpr2>, <condexpr> is evaluated as a conditional expression. If the result of the conditional expression is true, then <setexpr1> is used, else <setexpr2> is used. Thus, in the following example, PSW.ProblemState?{!Priv_Op}:{Priv_Op}, the result used is based on the current state of the PSW problem state. If the processor is in the problem state (true), then the set of instructions that are not privileged are used. If the processor is not in the problem state (false), then the set of instruction that are privileged are used. This capability of dynamically selecting a set of instructions from multiple sets of instructions is another advantage of meta-mnemonics and the methods herein disclosed.

Figure 3:
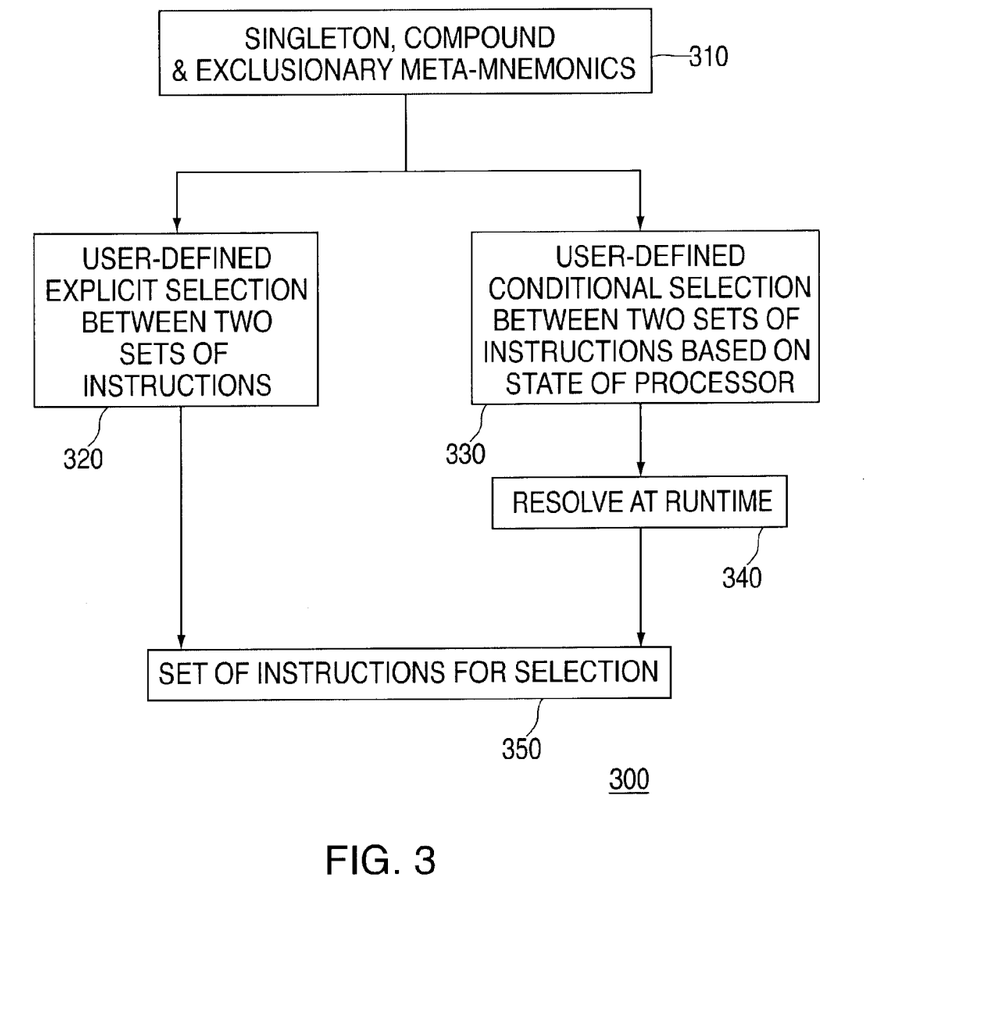
FIG. 3 is an exemplary flowchart for at least partially implementing the method of FIG. 1.

FIG. 3 depicts a general flowchart 300 of the dynamic selection process, which begins with the availability of sets of instructions such as singleton, compound and exclusionary meta-mnemonics 310. From block 310, the flowchart can either pass to the user-defined explicit selection block 320, or to the user-defined conditional selection block 330. At block 320, selection between two sets of instructions is accomplished by explicitly selecting a set of instructions based on a user-defined control statement, thereby resulting in the set of instructions available for selection by the instruction stream generator, block 350. At block 330, selection between two sets of instructions is accomplished by conditionally selecting a set of instructions based on the current state of the processor, which is resolved at runtime at block 340. The end result is also a set of instructions for execution by the processor, block 350.

Figure 4:
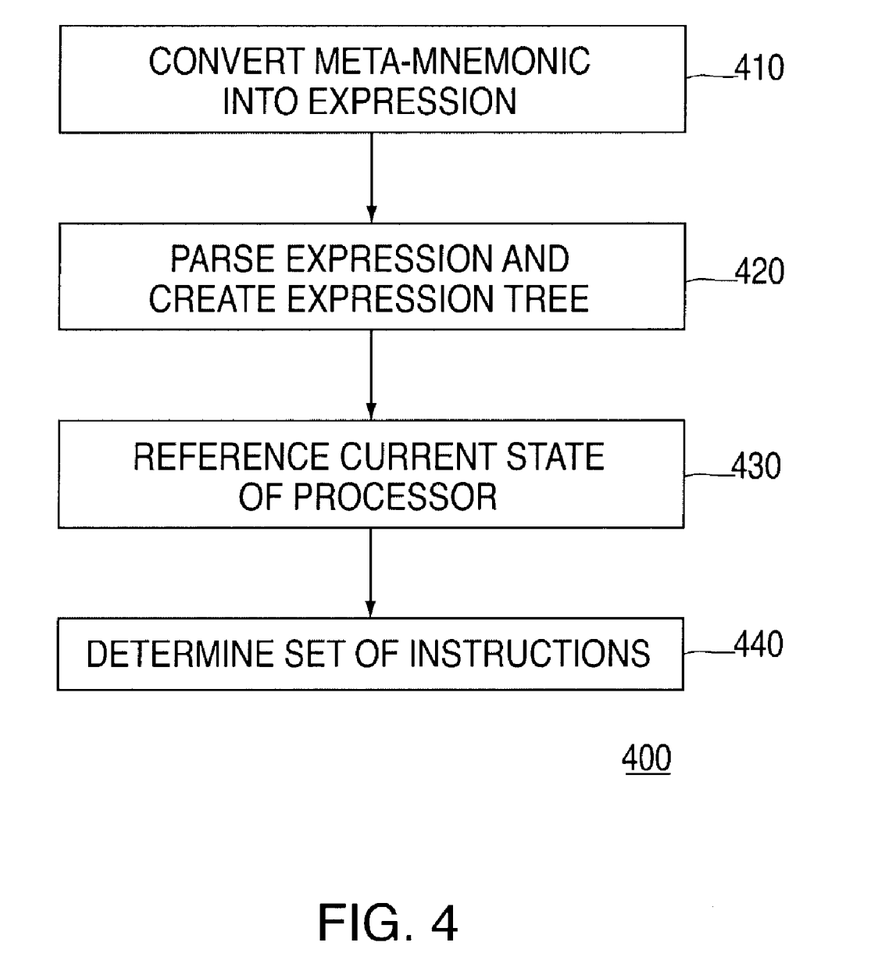
FIG. 4 is an exemplary process for at least partially implementing the method of FIG. 1.

During runtime, the instruction template guiding the instruction sequence generation is parsed and maintained as a linked-list of nodes, where each node contains information about the instruction to be generated. If the instruction is an explicit mnemonic, then that mnemonic is placed in the node. If the instruction is a control statement with a list of mnemonics, then a separate linked-list of the control statement and associated mnemonics is maintained with a node for each. Prior to parsing, a preprocessor is invoked which replaces all instances of a macro with its definition in-line. When the instruction is defined by a singleton meta-mnemonic, compound meta-mnemonic or expression of meta-mnemonics, an additional component is added to each instruction node that contains the pointer of the expression for the instruction. The singleton meta-mnemonics and compound meta-mnemonics are converted 410 to an simple expression which contain only the value of the meta-mnemonic, best seen by referring to the process 400 depicted in FIG. 4. Expressions are parsed and maintained as binary expression trees 420. These expression trees contain values for operators, operands and the meta-mnemonics and/or mnemonics specified. These expression trees also contain the conditional ternary operators and the resulting set definitions. When expressions are encountered in evaluation, the current state of the machine is referenced 430 by the machine state symbolic operands, the expression is calculated, and the ternary operator is evaluated to determine 440 which set of instructions to utilize.

Meta-mnemonics as herein disclosed have more flexibility than the macro-replacement or group identifier methods, utilize less storage and processing time, and are easier to maintain. Additionally, embodiments of the invention provide for: increased speed of generating a testcase by utilizing less internal storage/structures as expanded macros; reduced maintenance/duplication; reduced need for updating multiple macros; reduced need for creating new macros; ease of temporarily disabling instructions; increased flexibility of selecting instructions to select from; set expression support; conditionally selecting sets and dynamically-resolved classes (predefined or user-defined) that reduce the number of templates and overhead for specific initialization files and environments; and, implicit filtering for instruction flow type (sequential vs. non-sequential), which reduces the need for an explicit definition for each instruction.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for specifying a set of instructions selectable for generation by an instruction generator, comprising:
   identifying a first class name representative of a first class of instructions, said first class of instructions being a subset of an instruction set of a processor;
   concatenating said first class name with a unique identifier label thereby defining a unique singleton meta-mnemonic representative of a first set of instructions, said first set of instructions being a subset of said instruction set of said processor;
   specifying, via said singleton meta-mnemonic, said first set of instructions for selection by said instruction generator; wherein
   said singleton meta-mnemonic specifies a set of instructions that are a subset of said processor instruction set and are available for selection and generation by said instruction generator;
   identifying at least a second class name representative of at least a second class of instructions, said at least a second class of instructions being a subset of said instruction set;
   concatenating said first class name with said at least a second class name and a unique identifier label thereby defining a unique compound meta-nmemonic representative of at least a second set of instructions, each instruction in said at least a second set of instructions having membership in each of said classes;
   specifying, via said compound meta-nmemonic, said at least a second set of instructions for selection by said instruction generator; wherein
   said compound meta-mnemonic specifies a set of instructions that are a subset of said processor instruction set and are available for selection and generation by said instruction generator;
   concatenating at least one of said singleton meta-mnemonic and said compound meta-nmemonic with an exclusionary label thereby defining an exclusionary meta-nmemonic representative of a third set of instructions, each instruction in said third set of instructions having membership outside of the set of instructions defined by at least one of said singleton meta-mnemonic and said compound meta-nmemonic;
   specifying, via said exclusionary meta-nmemonic, said third set of instructions for selection by said instruction generator; wherein
   said exclusionary meta-nmemonic specifies a set of instructions that are a subset of said processor instruction set and are available for selection and generation by said instruction generator;
   converting at least one of said singleton, said compound, and said exclusionary meta-mnemonic into an expression containing the value of said converted meta-mnemonic;
   parsing the expression and creating a binary expression tree containing the values for at least one of an operator, an operand, said converted meta-mnemonic, a conditional ternary operator, and a definition of the resulting set of instructions;
   referencing the existing state of said processor; and
   determining which set of instructions to utilize based on the existing state of said processor.

2. The method of claim 1, wherein said concatenating at least one of said singleton meta-mnemonic and said compound meta-mnemonic with an exclusionary label comprises prefixing said first class name with said exclusionary label.

3. The method of claim 1, further comprising:
   selecting between two sets of instructions defined by said singleton meta-mnemonic, said compound meta-mnemonic, and said exclusionary meta-mnemonic, thereby resulting in a user-defined set of instructions for selection by said instruction generator.

4. The method of claim 3, wherein said selecting further comprises:
   conditionally selecting based on the existing state of said processor, thereby resulting in a conditional user-defined set of instructions for selection by said instruction generator.

5. The method of claim 4, further comprising:
   resolving said conditional user-defined set of instructions at runtime.

6. The method of claim 3, wherein said selecting further comprises:
   explicitly selecting based on a user defined control statement, thereby resulting in an explicit user-defined set of instructions for selection by said instruction generator.

7. The method of claim 1, further comprising:
   selecting a subset of instructions from a set of instructions based at least partially on whether an instruction specifies a first condition or specifies a second condition; and
   restricting said subset of instructions to include a first type of instruction if said instruction specifies said first condition, and to include a second type of instruction if said instruction specifies said second condition.

8. The method of claim 7, wherein:
   said set of instructions are control flow instructions;
   said first condition comprises no target node;
   said second condition comprises a target node;
   said first type of instruction comprises sequential type instructions; and
   said second type of instruction comprises non-sequential type instructions.

9. The method of claim 1, further comprising:
   selecting a subset of instructions from a set of instructions based at least partially on a set expression having at least one of a class expression, a conditional expression, a binary operator, a unary operator, said singleton meta-mnemonic, said compound meta-mnemonic, said exclusionary meta-mnemonic, and a mnemonic.

10. A processor programmed for specifying a set of instructions selectable for generation by an instruction generator, the processor being programmed for:
    identifying a first class name representative of a first class of instructions, said first class of instructions being a subset of an instruction set of said processor;
    concatenating said first class name with a unique identifier label thereby defining a unique singleton meta-nmemonic representative of a first set of instructions, said first set of instructions being a subset of said instruction set of said processor;
    identifying at least a second class name representative of at least a second class of instructions, said at least a second class of instructions being a subset of said instruction set;
    concatenating said first class name with said at least a second class name and a unique identifier label thereby defining a unique compound meta-mnemonic representative of at least a second set of instructions, each instruction in said at least a second set of instructions having membership in each of said classes;
    concatenating at least one of said singleton meta-mnemonic and said compound meta-mnemonic with an exclusionary label thereby defining an exclusionary meta-mnemonic representative of a third set of instructions, each instruction in said third set of instructions having membership outside of the set of instructions defined by at least one of said singleton meta-mnemonic and said compound meta-mnemonic;

specifying, via said singleton meta-mnemonic, said first set of instructions for selection by said instruction generator;

specifying, via said compound meta-mnemonic, said at least a second set of instructions for selection by said instruction generator; and specifying, via said exclusionary meta-mnemonic, said third set of instructions for selection by said instruction generator;

conditionally selecting between two sets of instructions defined by at least one of said meta-mnemonics based at least partially on the existing state of said processor, thereby resulting in a conditional user-defined set of instructions for selection by said instruction generator;

resolving said conditional user-defined set of instructions at runtime; and explicitly selecting between two sets of instructions defined by at least one of said meta-mnemonics based at least partially on a user defined control statement, thereby resulting in an explicit user-defined set of instructions for selection by said instruction generator.

11. The processor of claim 10, further programmed for:

converting at least one of said singleton, said compound, and said exclusionary meta-mnemonic into an expression containing the value of said converted meta-mnemonic;

parsing the expression and creating a binary expression tree containing the values for at least one of an operator, an operand, said converted meta-mnemonic, a conditional ternary operator, and a definition of the resulting set of instructions;

referencing the existing state of said processor; and determining which set of instructions to utilize based at least partially on the existing state of said processor.

12. The processor of claim 10, further programmed for:

selecting a subset of instructions from a set of control flow instructions based at least partially on whether an instruction specifies no target node or specifies a target node; and restricting said subset of instructions to include sequential type instructions if said instruction specifies no target node, and to include non-sequential type instructions if said instruction specifies a target node.

13. The processor of claim 10, further programmed for:

selecting a subset of instructions from a set of instructions based at least partially on a set expression having at least one of a class expression, a conditional expression, a binary operator, a unary operator, said singleton meta-mnemonic, said compound meta-mnemonic, said exclusionary meta-mnemonic, and a mnemonic.

14. A method for specifying a set of instructions for selection by an instruction generator, comprising:

referencing the existing state of a processor and determining the architecture mode of said processor;

referencing the architecture table of said processor and determining whether said architecture mode is a valid architecture mode for an instruction as determining by reference to said architecture mode in said architecture table for said instruction;

assigning a valid architecture class name to said instruction in response to said architecture mode of said processor being a valid architecture mode specified for said instruction in said architecture table; wherein said valid architecture class name specifies a valid set of instructions that are a subset of said processor instruction set and are available for selection and generation by said instruction generator; and assigning a disabling class name to a second instruction so as to remove said second instruction from every class associated with said second instruction.

15. The method of claim 14, further comprising:

assigning an aborting class name to a third instruction; and aborting a testcase in response to said processor encountering said third instruction.

* * * * *